United States Patent [19]

Volz et al.

[11] Patent Number: 4,982,298
[45] Date of Patent: Jan. 1, 1991

[54] ADAPTIVE VELOCITY PROFILE SYSTEM FOR A DISK DRIVE HEAD

[75] Inventors: LeRoy A. Volz, Northridge; Haim Nissimov, West Hills, both of Calif.

[73] Assignee: Rigidyne Corporation, Simi Valley, Calif.

[21] Appl. No.: 226,891

[22] Filed: Aug. 1, 1988

[51] Int. Cl.$^5$ .............................................. G11B 5/55
[52] U.S. Cl. .................................................. 360/78.06
[58] Field of Search ......................... 360/78.06, 78.07; 318/561

[56] References Cited

U.S. PATENT DOCUMENTS

| | | | |
|---|---|---|---|
| 3,860,861 | 1/1975 | Gucker | 360/78.07 X |
| 4,031,443 | 6/1977 | Droux | |
| 4,297,734 | 10/1981 | Laishley | |
| 4,333,117 | 6/1982 | Johnson | |
| 4,488,189 | 12/1984 | Axmear | |
| 4,538,230 | 1/1987 | Lee | |
| 4,544,968 | 10/1985 | Anderson | |
| 4,562,562 | 12/1985 | Moriva | |
| 4,591,933 | 5/1986 | Quackenbush | 360/78.06 X |
| 4,622,604 | 11/1986 | Hashimoto | |
| 4,636,883 | 1/1987 | Hashimoto | |
| 4,677,507 | 6/1987 | Elliot | 360/78.07 |
| 4,835,633 | 5/1989 | Edel et al. | 318/561 X |

Primary Examiner—Aristotelis M. Psitos
Assistant Examiner—David L. Robertson
Attorney, Agent, or Firm—Kelly Bauersfeld & Lowry

[57] ABSTRACT

An adaptive velocity profile system is provided for variably controlling a disk drive head in a computer disk drive or the like, to obtain substantially minimum seek times in accordance with variable operating conditions. The system monitors actual performance of the head in the course of a seek step during which the head is displaced relative to a memory storage disk for alignment with a selected track on the disk, and wherein the head performance is variable in response to a range of parameters such as temperature, power supply voltage, mechanical stiffness, etc. The monitored head performance as represented, for example, by head acceleration at the initiation of a seek step and/or by a track address mismatch at the conclusion of a seek step is used, in the preferred form, to select an appropriate one of several available velocity profiles for controlled head deceleration at the conclusion of a subsequent seek step. The selected velocity profile is chosen for obtaining the fastest possible seek times consistent with current operating conditions.

9 Claims, 3 Drawing Sheets

ADAPTIVE VELOCITY PROFILE SYSTEM FOR A DISK DRIVE HEAD

BACKGROUND OF THE INVENTION

This invention relates generally to computer disk drive units and related control systems for use in a personal computer environment or the like. More particularly, this invention relates to a relatively simple control system for regulating the operation of a disk drive head in a manner achieving substantially minimum seek times consistent with variable operating parameters.

In recent years, microcomputer equipment such as personal or desk top computers have become extremely popular for a wide range of business, educational, recreational and other uses. Such computers typically include a main central processor having one or more memory storage disks for storage of data. The storage disk or disks are commonly provided as part of a so-called Winchester disk drive unit, sometimes referred to as a "hard" disk, wherein the storage disks are rotatably supported within a substantially sealed housing. The disks are rotatably driven in unison by a small spindle motor, and one or more electromagnetic heads are displaced by a head actuator assembly to traverse surfaces of the disks for purposes of reading and writing data. Such data is recorded onto magnetizable surfaces or surface films of the disks in the form of data bits located within narrow, closely spaced concentric tracks on the disks. Accordingly, for any given disk drive unit, the total memory storage capacity is directly proportional to the number of disks as well as the number of tracks on each disk.

In normal operation, a system controller of the main central processor has the capability to identify data stored by recording on the disks, typically through the use of directory name, file name, and/or track address information. When reading of data at a specified data track is desired, the system controller displaces the head or heads to the desired position by supplying appropriate command signals to operate the head actuator assembly. Alternately, when data recording or writing is desired, the system controller operates the actuator assembly to align a selected head with a vacant data track. In either case, the head actuator assembly is commanded to displace the head or heads through a generally radial path relative to the disk for moving each head from alignment with a previously selected track to alignment with the newly selected destination track. Such movement of the head is normally referred to as a "seek" step.

For optimum disk drive unit performance, it is desirable to displace the head or heads through each seek step in a minimum time period consistent with accurate head alignment with the destination track. Alternately stated, it is desirable to displace the head from one track to another at the fastest possible speed, including the fastest possible acceleration and deceleration without incurring a seek error. However, the selection of a specific velocity profile during a seek step requires consideration of a wide range of electrical and mechanical design factors, some of which are subject to significant variations over time and/or from one computer to another. For example, temperature, mechanical stiffness of the actuator assembly, power supply voltage, etc. are subject to variations which can affect the optimum seek velocity profile without errors. In the past, these design factors have been accommodated by selecting a seek velocity profile in accordance with a worst case condition, thereby minimizing or avoiding seek errors. Unfortunately, this approach results in a failure to utilize an optimized velocity profile for achieving minimum seek times during most normal operating conditions.

There exists, therefore, a significant need for a relatively simple yet effective system for selecting a substantially optimized seek velocity profile in accordance with variable operating conditions of a disk drive unit. The present invention fulfills these needs and provides further related advantages.

SUMMARY OF THE INVENTION

In accordance with the invention, an adaptive velocity profile system is provided for use in controlling the seek velocity profile of a read/write head in a computer disk drive unit or the like. The disk drive unit includes at least one electromagnetic read/write head which is movably positioned by a head actuator assembly relative to closely spaced tracks on a rotatably driven memory storage disk. The control system monitors and responds to the actual performance of the head in the course of a seek step, as the head is displaced relative to the disk into alignment with a selected destination track, to select a seek velocity profile chosen for minimum seek time without seek error.

In the preferred form of the invention, the control system includes a microcontroller programmed to monitor selected performance parameters as the head is displaced through a seek step, and to respond to those selected parameters to apply one of several deceleration velocity profiles in accordance with current disk drive operating conditions. The selected deceleration velocity profile is utilized during one or more subsequent seek steps to control the deceleration of the head as it approaches alignment with the destination track. In the preferred form, the system monitors head acceleration at the beginning of each seek step, as well as the occurrence of a seek error at the conclusion of a seek step. When the acceleration level is high without resultant seek error, a rapid deceleration velocity profile is selected for use during the succeeding seek step. However, when the acceleration level is low and/or a seek error occurs, a slower deceleration velocity profile is selected.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
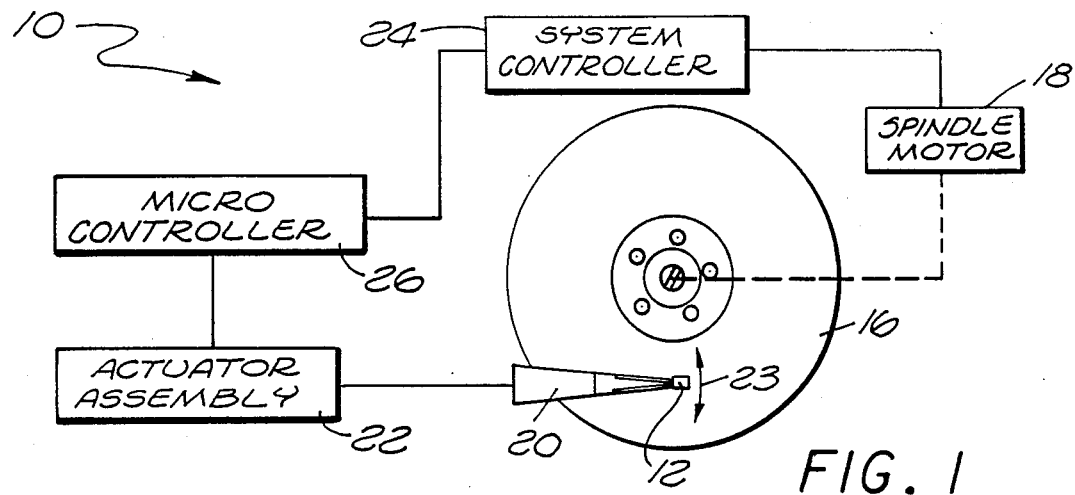
FIG. 1 is a somewhat schematic diagram illustrating a typical memory storage disk for a computer disk drive unit in association with a head for use in reading and/or writing data.

As shown in the exemplary drawings, an adaptive velocity control system is provided in a computer disk drive unit referred to generally in FIG. 1 by the reference numeral 10, of the type used in microcomputers such as personal and desk top computers and the like. The velocity profile control system provides a relatively simple adaptive arrangement for variably controlling displacement of an electromagnetic head 12 with respect to closely spaced annular tracks or cylinders 14 (FIG. 2) on a memory storage disk 16. Importantly, the adaptive control system is responsive to current operational parameters of the disk drive unit to select from an available group of velocity profiles to achieve substantially minimum head displacement times without error introduction.

As shown schematically in FIG. 1, a typical computer disk drive unit 10 includes at least one memory storage disk 16 mounted for rotation about a central axis thereof in response to operation of a spindle motor 18. The disk includes a magnetizable surface or surface film on at least one and preferably both sides thereof, wherein this film is adapted to record and store data bits arranged within the closely spaced tracks 14. The electromagnetic head 12 is carried by an arm 20 of a head actuator assembly 22 in close proximity with the disk surface for purposes of reading and writing data. As is known in the art, during normal operation of the disk drive unit, the actuator assembly 22 repeatedly displaces the head 12 through radial traverses or seek steps, as indicated by arrow 23 in FIGS. 1 and 2, to align the head 12 with a selected one of the disk tracks 14. A main system controller 24 of the computer signals a microcontroller 26 of the disk drive unit to operate the actuator assembly 22 in a manner positioning the head 12 in alignment with a selected disk track.

While FIG. 1 illustrates the general components of a typical disk drive unit 10 for use in a personal computer or the like, it will be understood that multiple memory storage disks 12 may be mounted in a common stack for rotation in unison upon operation of the single spindle motor 18, and further that multiple read/write heads 12 may be provided on separate arms 20 of a multi-armed actuator assembly 22 for positioning the various heads in close relation with respective upper and lower surfaces of the multiple disks 16. In such a multi-disk disk drive construction, the several heads 12 are displaced in unison through radial traverses relative to the multiple disks, with the main system controller 24 designating one of the heads to be operational at any given time for purposes of reading and/or writing data. An exemplary multiple disk, multiple head disk drive construction is described in more detail in U.S. Serial No. 173,618, entitled ACTUATOR ASSEMBLY FOR HARD DISK DRIVES, filed Mar. 25, 1988, now U.S. Pat. No. 4,879,617 and in U.S. Ser. No. 173,619, entitled DISK DRIVE SPINDLE MOTOR, filed Mar. 25, 1988, now U.S. Pat. No. 4,905,100 both of which are incorporated by reference herein. The use of a multiple disk, multiple head disk drive is, of course, frequently desired due to the increased overall disk surface area and correspondingly increased data storage capacity.

Figure 2:
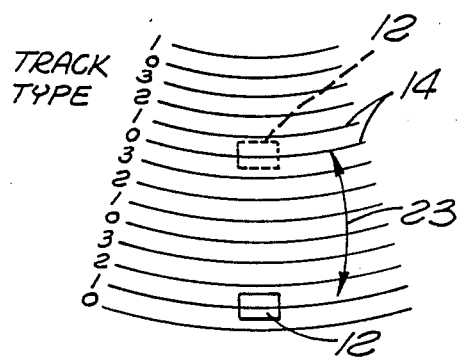
FIG. 2 is an enlarged schematic representation illustrating head position relative to multiple track types on the disk as used, for example, in a conventional quadrature track configuration.

In a typical multi-disk disk drive unit, one disk surface comprises a servo surface bearing prerecorded servo data arranged in closely spaced tracks. This servo data in monitored by the associated head 12 to provide appropriate feedback signals to microcontroller servo circuits (not shown) for operating the actuator assembly 22 in a manner maintaining the head 12 in generally centered alignment with a specified servo track. Such alignment of the servo head 12 functions to position the remaining heads in a similar centered alignment with corresponding data tracks on their associated disk surfaces. In this regard, as viewed generally in FIG. 2, one common arrangement for the servo data utilizes a so-called quadrature servo track configuration wherein servo data is recorded in patterns of repeating track groups of four across the radial span of the disk surface. Each track group thus defines four recognizably different track types which are conventionally designated as track types "0", "1", "2" and "3" (FIG. 2). As is known in the art, the servo system recognizes changes in track type as the head 12 is displaced through a seek step from one track to another to count track crossings, thereby monitoring the magnitude of head displacement. A more detailed description of a preferred servo system and related quadrature servo track configuration designed additionally to permit servo system recognition of each track by unique track address data is found in Serial No. 173,770, filed Mar. 28, 1988, and entitled SERVO ADDRESS SYSTEM, which is incorporated by reference herein.

The adaptive velocity profile system of the present invention is designed to obtain the fastest possible seek times for the head or heads 12 in the course of movement through a seek step from alignment with a prior track to alignment with a different or destination track 14 on the associated surface of a storage disk 16. The velocity profile pattern is selected from among a plurality of different velocity profiles to optimize the average seek time to a new track, consistent with a range of operating parameters which may vary from one computer to another, or with respect to the same computer over a period of time. The control system thus automatically reduces track seek time during favorable operating conditions, and increases track seek time during unfavorable operating conditions, all in a manner designed to provide the shortest possible seek time consistent with avoidance of seek errors.

Figure 3:
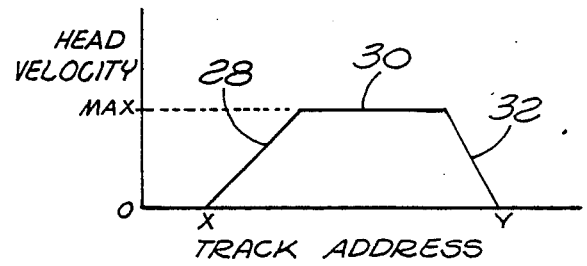
FIG. 3 is a graphic representation depicting an exemplary velocity profile for the head during a seek step moving between tracks designated as "X" and "Y"

FIG. 3 represents in graphic form an exemplary velocity profile for the head 12 in the course of a seek step involving head displacement from alignment with a prior track "X" to alignment with a new destination track "Y". As shown, when a seek step is desired, the microcontroller 26 appropriately signals the head actuator assembly 22 to displace the head 12 in a selected direction for alignment with the destination track "Y". In this regard, other than initial calibration mode functions when the computer is turned on, the microcontroller normally responds to commands from the main system controller 24. The direction and magnitude of head displacement will depend, of course, upon the relative locations of the tracks "X" and "Y", with a typical storage disk 16 in a 3.5 inch diameter disk drive unit having about 1,000 to 1,500 tracks. In any case, the head 12 is initially accelerated with increasing velocity from the track "X" through an acceleration phase 28 (FIG. 3) to a maximum velocity phase represented by the straight line 30, followed by an appropriate deceleration phase 32 during which the head velocity is reduced as the head approaches and stops in centered alignment with the destination track "Y". Alternately, for relatively short length seek steps, the head may not reach the maximum velocity phase 30 before deceleration is initiated.

Figure 4:
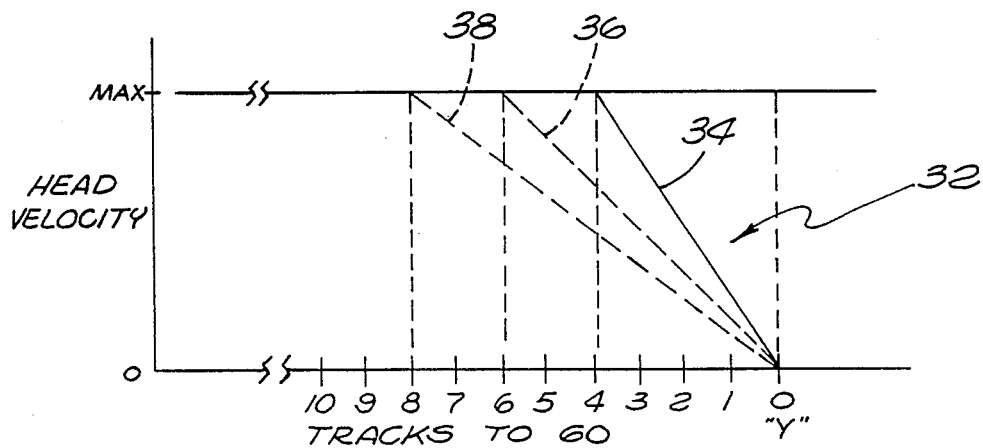
FIG. 4 is an enlarged graphic representation showing alternative selection of multiple deceleration velocity profiles at the conclusion of a seek step, in accordance with the novel features of the invention.

In general terms, the control system of the present invention monitors parameters representative of head performance during each seek step to select one of several deceleration velocity profiles as shown graphically in FIG. 4. More particularly, the control system regulates the deceleration phase of the seek step in accordance with variable operating conditions which are represented by head performance during other phases of the seek step. The illustrative embodiment of the invention utilizes three different deceleration velocity profiles, namely, fast, medium and slow deceleration profiles 34, 36 and 38. These profiles are shown in FIG. 4 as deceleration lines which descend from the maximum head velocity phase 30 at different track distances from the destination track "Y". For example, the fast profile 34 is shown to decelerate the head rapidly when the head reaches a position of four tracks from the destination. The medium and slow profiles 36 and 38 are shown to decelerate more slowly beginning at positions of six and eight tracks, respectively, from the destination track. For favorable operating conditions, the fast profile 34 is selected to achieve the shortest average seek time.

Figure 5:
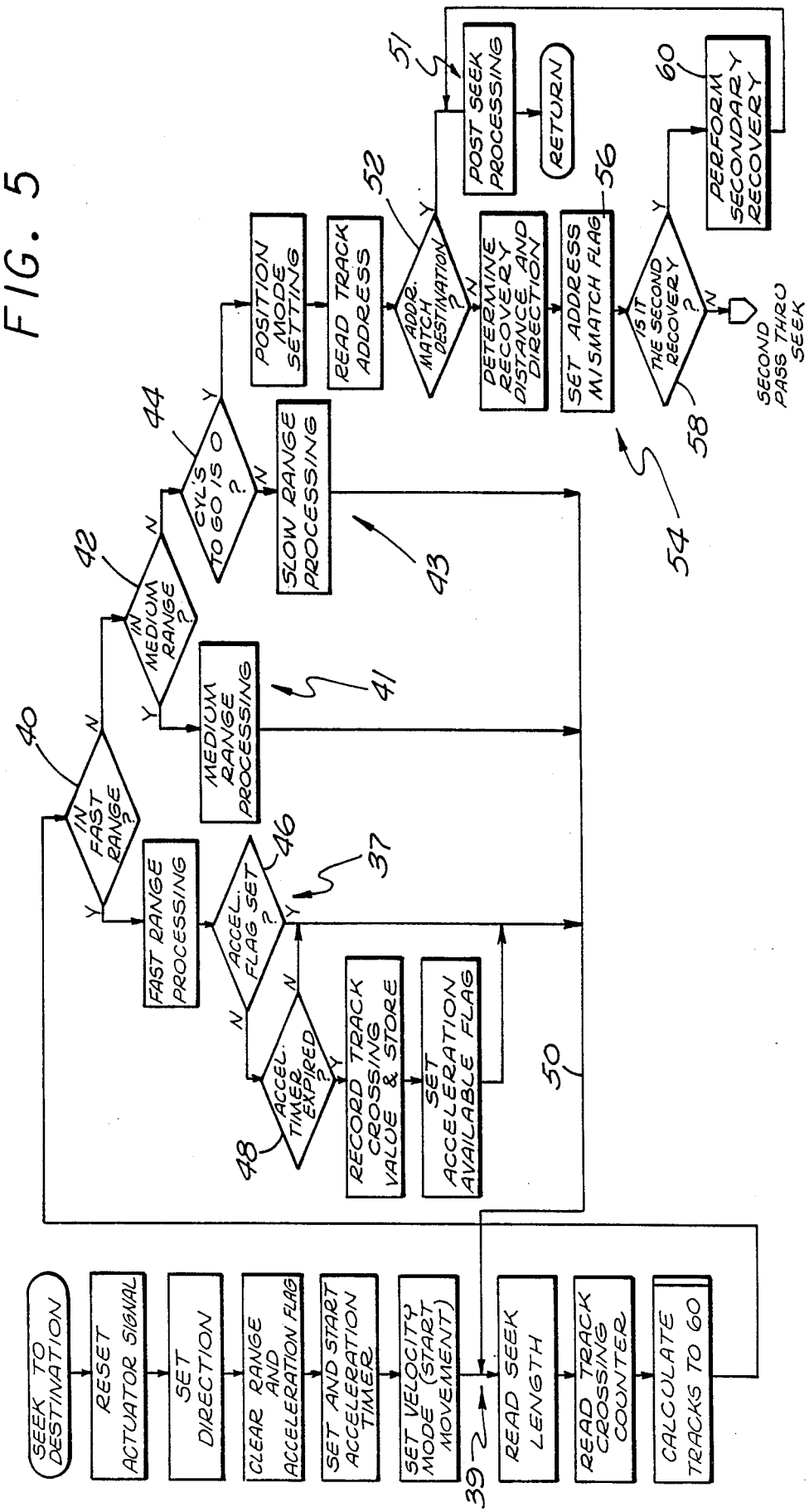
FIG. 5 is a flow chart illustrating a typical seek operation in accordance with the invention.

FIG. 5 illustrates in flow chart form a preferred process sequence programmed into the microcontroller 26 for regulating head displacement during a seek step. More particularly, at the initiation of a seek step, the microcontroller 26 resets its output signal to the head actuator assembly 22 for commanding the actuator assembly to accelerate from its current position (as represented at track "X" in FIG. 3). The microcontroller sets the movement direction, either radially inward or outward, depending upon the location of the destination track "Y" relative to track "X". As further preliminary steps, the microcontroller clears any range or speed setting, as will be described in more detail, and clears an acceleration flag. An acceleration timer is also reset and started simultaneously with initiation of head movement through the commanded seek step. At the initiation of head movement, by operation of the actuator assembly, the program enters a primary loop 39 which controls and monitors head performance throughout the seek step.

As the head 12 is displaced by the actuator assembly through the seek step, the microcontroller reads the seek length by interpretation of the destination track identity as commanded by the main system controller. The number of track crossings is also read and monitored, by conventional monitoring of head movement relative to the preferred quadrature servo tracks as previously described, and the number of "tracks to go", namely, the number of tracks remaining before the destination track, is determined.

Based on the foregoing determination of the tracks to go before the destination track is reached, the microcontroller selects one of several subloops for different processing speed ranges to control head displacement. For example, in general terms, when the seek step is relatively long and the number of tracks to go is relatively large (e.g. more than 200), a fast range processing subloop 37 is utilized to accelerate the head 12 as fast as possible to the maximum possible velocity (FIG. 3) by appropriate control of the microcontroller output to the actuator assembly. In the fast range processing subloop 37, the performance of the actuator assembly and the head during the acceleration phase 28 is monitored for use in later selection of a deceleration phase velocity profile. As the head approaches the destination track "Y", the microcontroller switches to a medium range processing subloop 41 and then to a slow range processing subloop 43 for improved head displacement control, for example, in accordance with different velocity tables programmed into the microcontroller and/or different sampling rates for monitoring the number of tracks to go. Alternately, for relatively short length seek steps, the microcontroller may omit the fast range processing sequence and instead directly to the medium or slow range processing subloops. In either case, the general programming and functional operation of the various speed range processing subloops is known in the art and thus is not described in further detail herein.

More specifically, with reference to FIG. 5, at decision block 40, the microcontroller 26 responds to the number of tracks to go before the head 12 reaches the destination track to apply the appropriate processing speed subloop. In one illustrative example, the decision block 40 will select the fast range processing subloop when the number of tracks to go exceeds a selected threshold, such as over 200. However, if the number of tracks to go is less than the selected threshold, a second decision block 42 determines whether to apply the medium range processing, such as when the number of tracks to go ranges from about 8 to 200. Finally, when the number of tracks to go is less than the number applicable to the medium range processing subloop, a third decision block 44 functions to apply the slow range processing until the destination track "Y" is reached.

When the number of tracks to go is large, the fast range processing is applied to accelerate the head with maximum acceleration to the maximum design velocity, as previously described. At decision block 46, the microcontroller determines whether the acceleration flag has been set; upon the initial pass, the acceleration flag is not set due to the clearing thereof preliminary to head displacement. A timer decision block 48 then determines whether the acceleration timer has reached a preset termination point, such as about 3 milliseconds. If the timer has not reached the termination point, the program returns to the beginning of the primary loop 39, as indicated by line 50 for a subsequent pass including redetermination of the number of tracks to go to the destination track. Alternately, when the timer has expired, the timer decision block 48 is followed by a reading and recording in memory of the number of track crossings which have occurred during the timer period and the acceleration flag is set, followed in turn by a second pass through the primary loop.

Importantly, the stored number of track crossings during the timer period represents in digital form the acceleration of the head during the acceleration phase of the seek step, and thereby also represents the acceleration performance of the head during that particular seek step. Such acceleration performance can be affected by a range of potentially variable conditions, such as temperature, mechanical stiffness of the actuator assembly, electrical variations such as power supply voltage, etc. During ideal or favorable operating conditions, the acceleration level as indicated by the digital record will be high, with a corresponding rapid seek time due to the high acceleration.

Alternately, when the number of tracks to go is less than the number required to enter the fast range processing subloop 37, the medium or slow range processing subloops are initiated, as appropriate. Once again, these slower processing range subloops will be utilized at the conclusion of a long seek step due to repeated passes through the primary loop as the number of tracks to go continuously diminishes, or in a short seek step of insufficient length to initiate the fast range processing subloop. Eventually, when the number of tracks to go reaches zero to indicate head alignment with the destination track "Y", the third decision block 44 switches the microcontroller from the velocity mode for head displacement to a position mode. In the position mode, the microcontroller confirms head alignment with the designated destination track and performs a post seek processing subroutine 51 (FIG. 6) to select a deceleration velocity profile for use during one or more subsequent seek steps.

More specifically, with continued reference to FIG. 5, the microcontroller in the position mode reads the address of the track actually aligned with the head 12. A preferred servo system permitting the specific track address to be read by unique address data is disclosed in the above-referenced U.S. Ser. No. 173770. The track associated with the actual head position is then compared at decision block 52 with the address of the desired destination track "Y". In virtually all conditions of operation, the addresses will match to indicate the absence of a seek error, whereupon the post seek processing subroutine 51 of FIG. 6 will be initiated. However, in the event of address mismatch to indicate a seek error, the decision block 52 initiates an error recovery subloop 54 to reposition the head into alignment with the desired destination track.

In a preferred error recovery method, the microcontroller initially analyzes the actual and desired track addresses to determine the magnitude and direction of the error. An address mismatch flag 56 is then set, and the primary seek program is re-entered as if performing a subsequent seek step, all as previously described. When the head is repositioned, the position mode of the program is re-entered. If a seek error still exists, the error recovery subloop 54 is re-entered for a second pass. A decision block 58 identifies the second pass to initiate a secondary recovery process 60 wherein, in the preferred form, the head is indexed one track at a time until alignment with the desired destination track is obtained. When such proper head alignment is achieved, the post seek processing subroutine 51 is initiated.

Figure 6:
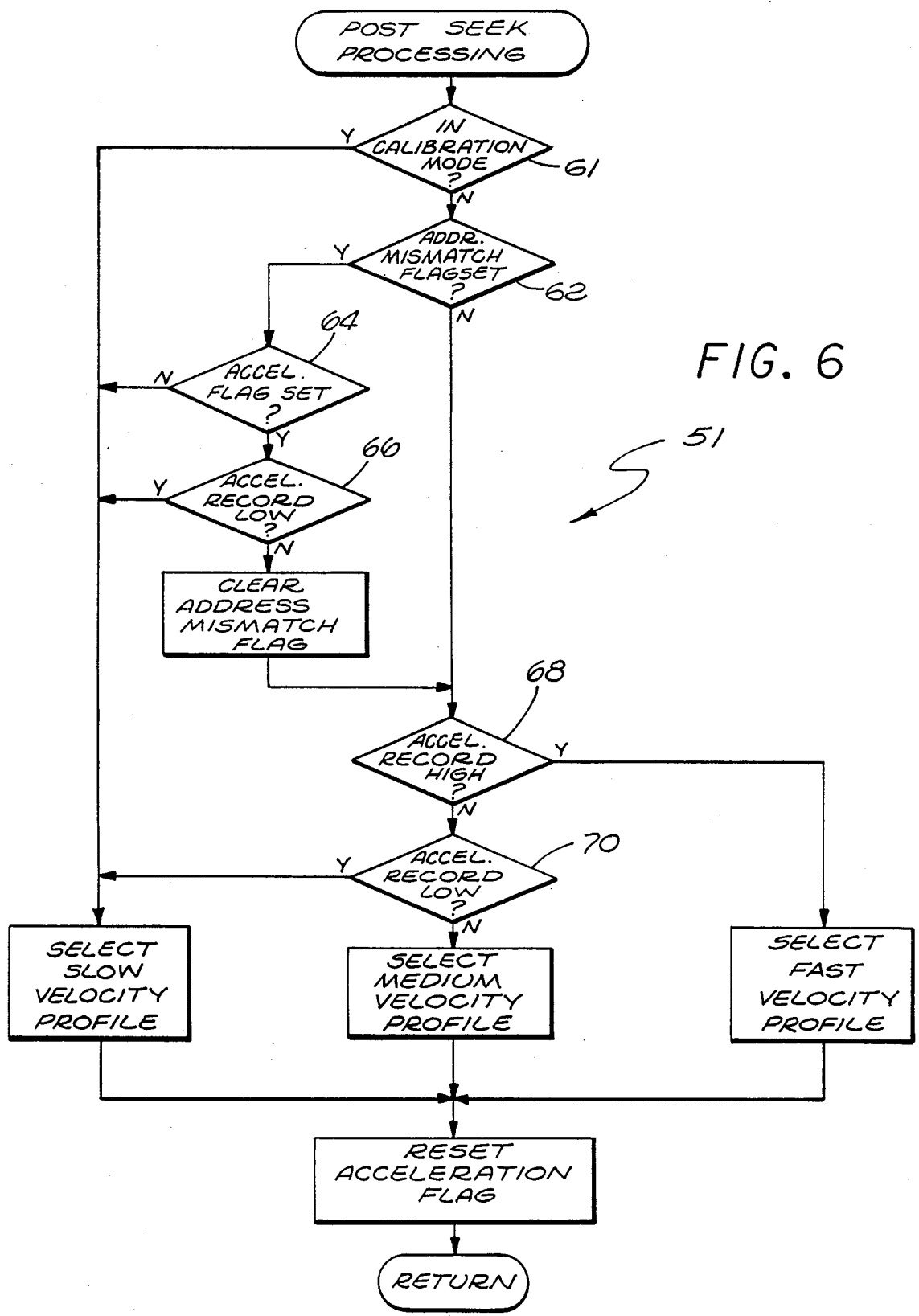
FIG. 6 is a flow chart illustrating a post seek subroutine responsive to parameters monitored during a seek step to select one of the deceleration velocity profiles for use during a subsequent seek step.

As shown in FIG. 6, the post seek processing subroutine includes an initial decision block 61 for determining whether the disk drive unit is operating in a normal mode for reading or writing of data, or in a calibration mode upon initial power up of the computer system. More specifically, when the computer system is turned on, a preprogrammed calibration sequence is followed which includes the performance of several seek steps by the disk drive unit to verify proper unit operation. In the calibration mode, seek times for the various seek steps are not critical, and extremely high head accelerations or velocities are not desirable due to potential conditions adverse to such high accelerations or velocities. Accordingly, the slow range processing is preprogrammed to select the slow deceleration velocity profile 38 (FIG. 4) for the first seek step during the calibration mode. For subsequent seek steps during the calibration mode, the decision block 61 (FIG. 6) responds to the calibration operation to select the slow velocity profile 38 for the slow range processing sequence, followed by clearing of the acceleration flag and exit from the subroutine to await the next seek step.

However, when the disk drive unit is in the normal mode of operation, a subsequent decision block 62 determines whether the address mismatch flag 56 has been set. If the address mismatch flag is set, the program routes to another decision block 64 which determines whether the acceleration flag has been set to indicate the presence of an acceleration record stored in memory. Such acceleration record, of course, is stored whenever the seek length is sufficiently long to permit the acceleration timer to expire in the course of the fast range processing subloop (FIG. 5). If the acceleration flag is not set, the slow velocity profile 38 is again selected due to insufficient information regarding current head acceleration performance, and the subroutine 51 is exited as before.

Alternately, when an acceleration flag is set, the decision block 64 then routes the program to decision block 66 for reading and responding to the magnitude of the acceleration record. More particularly, the decision block 66 determines whether the acceleration record is below a predetermined minimum threshold, such as below about 50 track counts within the acceleration timer period of about 3 milliseconds. When the acceleration record is low to indicate potentially unfavorable current operating conditions, the decision block 66 again routes the subroutine to select the slow deceleration velocity profile 38 prior to exiting the subroutine. However, if the acceleration record is above the minimum threshold, the decision block 66 routes the subroutine to clear the address mismatch flag 56 and further to a subsequent decision block 68 for determining if the acceleration record is above a predetermined high threshold, such as above about 65 track counts during the timer period. When the acceleration in above the high threshold, the subroutine selects the fast velocity profile 34 prior to subroutine exit. Or, if the acceleration is below the high threshold, the subroutine selects the medium velocity profile 36 before exit.

When there is no address mismatch during normal operation of the disk drive unit, as determined by the decision block 62, the subroutine is routed directly to the decision block 68 which determines if the acceleration record is above the predetermined high threshold. If the acceleration record is not above the high threshold, the decision block 68 routes the program to another decision block 70 which determines if the record is below the minimum threshold, as previously described relative to the decision block 66. If the acceleration record is below the low threshold, the decision block 70 routes the program to select the slow velocity profile 38. Alternately, if the acceleration record is above the low threshold, the program selects the medium velocity threshold 36.

However, if the acceleration record exceeds the high threshold, the decision block 68 causes the subroutine to select the fast velocity profile 34. In any case, after velocity profile selection, the acceleration flag is cleared followed by exit from the subroutine 51 to await the next seek step.

The selected deceleration velocity profile is applied to the medium and slow range processing subloops 41 and 43 (FIG. 5) to control head deceleration during a subsequent seek step performed by the disk drive unit. Accordingly, the deceleration profile and thus the overall seek time for any given seek step is effectively regulated to accommodate current operating conditions of the system. When operating conditions are favorable, the fast deceleration profile is selected for achieving minimum seek times without seek error. However, when conditions are relatively unfavorable, the seek times are proportionally increased by the selection of the medium or slow deceleration profile to provide the fastest possible seek times without seek errors. The particular deceleration velocity profile programmed into the medium and slow range processing subloops will remain until a different velocity profile is selected as will occur, for example, when a relatively long seek step achieves a high level acceleration for appropriate response during the post seek processing subroutine applicable to that seek step.

Accordingly, the adaptive velocity profile control of the present invention provides a simple and automatic system for variable selection of different head velocity profiles during seek steps, in accordance with current operating conditions of the disk drive unit. The control system operates the head for minimum seek times during favorable operating conditions, but adjusts the relative seek times during unfavorable conditions to obtain the best disk drive performance consistent with operating conditions.

A variety of modifications and improvements to the adaptive control system of the present invention will be apparent to those skilled in the art. For example, while selection from among three different velocity profiles is shown and described, it will be understood that any selected number of appropriate velocity profiles may be utilized. Accordingly, no limitation on the invention in intended by way of the foregoing description and accompanying drawings, except as set forth in the appended claims.

What is claimed is:

1. In a computer disk drive unit or the like having a disk drive head and actuator means for moving the head through a succession of seek steps for alignment with successive selected tracks on an associated memory storage disk, an adaptive velocity profile system for controlling head movement during said seek steps, comprising:
    controller means for operating said actuator means to move the head through a succession of seek steps each including accelerating the head with a commanded acceleration velocity profile from alignment with a first track on the memory storage disk and decelerating the head with a selected one of a plurality of deceleration velocity profiles to alignment with a destination track on the disk;
    means for monitoring actual head acceleration level during each seek step of a predetermined minimum seek length; and
    means responsive to the monitored actual head acceleration level for selecting one of said deceleration velocity profiles and for controlling operation of said head moving means in accordance therewith during at least one subsequent seek step to control head deceleration for alignment with a destination track associated with said at least one subsequent seek step, said acceleration level responsive means including means for selecting a relatively slow deceleration velocity profile when said actual head acceleration level is low, and for selecting a relatively fast deceleration velocity profile when said actual head acceleration level is relatively high.

2. The adaptive velocity profile system of claim 1 wherein said acceleration level responsive means includes means for selecting from among at least three different deceleration velocity profiles in accordance with the actual head acceleration level.

3. The adaptive velocity profile system of claim 1 wherein said acceleration level responsive means further includes means for detecting occurrence of an address mismatch between the actual position of the head at the conclusion of each seek step and the position of the destination track associated therewith, and for responding thereto to select a relatively slow deceleration velocity profile.

4. The adaptive velocity profile system of claim 1 wherein said acceleration level responsive means selects said deceleration velocity profile at the conclusion of each seek step having the predetermined minimum seek length.

5. The adaptive velocity profile system of claim 1 wherein said acceleration level responsive further includes means for sensing operation of the disk drive unit in a calibration mode, and for responding thereto to select a relatively slow deceleration velocity profile.

6. In a computer disk drive unit or the like having a disk drive head and means for moving the head through a succession of seek steps for alignment with successive selected tracks on an associated memory storage disk, an adaptive velocity profile method for controlling head movement during said seek steps in accordance with performance of the head during said seek steps, said method comprising the steps of:
    moving the head through a succession of seek steps each including accelerating the head with a commanded acceleration velocity profile from alignment with a first track on the memory storage disk and decelerating the head with a selected one of a plurality of deceleration velocity profiles to alignment with a destination track on the disk;
    monitoring actual head acceleration level during each seek step of a predetermined minimum seek length; and
    responding to the monitored actual head acceleration level to select one of said deceleration velocity profiles for controlling operation of said head moving means in accordance therewith during at least one subsequent seek step to control head deceleration for alignment with a destination track associated with said at least one subsequent seek step, said responding step including selecting a relatively fast deceleration velocity profile when the monitored actual head acceleration level is high, and selecting a relatively slow deceleration velocity profile when the monitored actual head acceleration level is low.

7. The method of claim 6 further including the step of detecting occurrence of an address mismatch between the actual position of the head at the conclusion of each seek step and the position of the destination track associated therewith, and responding thereto by selecting a relatively slow deceleration velocity profile.

8. The method of claim 6 wherein said responding step includes selecting and deceleration velocity profile at the conclusion of each seek step of the predetermined minimum seek length.

9. The method of claim 6 further including the step of sensing operation of the disk drive unit in a calibration mode, and responding thereto to select a relatively slow deceleration velocity profile.

* * * * *